United States Patent
Ahn et al.

(10) Patent No.: US 8,647,761 B2
(45) Date of Patent: Feb. 11, 2014

(54) ELECTRODE ASSEMBLY AND SECONDARY BATTERY USING THE SAME

(75) Inventors: Chang-Bum Ahn, Yongin-si (KR); Chan-Seok Kim, Yongin-si (KR); Yong-Kyun Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 69 days.

(21) Appl. No.: 13/403,812

(22) Filed: Feb. 23, 2012

(65) Prior Publication Data

US 2012/0237809 A1 Sep. 20, 2012

(30) Foreign Application Priority Data

Mar. 16, 2011 (KR) ........................ 10-2011-0023349

(51) Int. Cl.
| | |
|---|---|
| *H01M 10/0587* | (2010.01) |
| *H01M 10/02* | (2006.01) |
| *H01M 2/00* | (2006.01) |
| *H01M 2/20* | (2006.01) |

(52) U.S. Cl.
USPC .......................................................... 429/94

(58) Field of Classification Search
USPC ........................................................ 429/94
See application file for complete search history.

(56) References Cited

U.S. PATENT DOCUMENTS

| | | | | |
|---|---|---|---|---|
| 2003/0044677 | A1* | 3/2003 | Naruoka ........................ | 429/161 |
| 2003/0134186 | A1* | 7/2003 | Shizuki ........................... | 429/94 |
| 2005/0221178 | A1 | 10/2005 | Kim | |
| 2006/0024568 | A1* | 2/2006 | Lee ................................ | 429/130 |
| 2006/0024578 | A1 | 2/2006 | Lee | |
| 2006/0154145 | A1* | 7/2006 | Lee ................................ | 429/211 |
| 2007/0009793 | A1 | 1/2007 | Kim et al. | |
| 2007/0231701 | A1* | 10/2007 | Lee ................................ | 429/246 |
| 2008/0076019 | A1 | 3/2008 | Wu | |
| 2010/0233521 | A1 | 9/2010 | Byun et al. | |
| 2010/0310913 | A1* | 12/2010 | Kim et al. ........................ | 429/94 |

FOREIGN PATENT DOCUMENTS

| | | |
|---|---|---|
| JP | 2000-150306 | 5/2000 |
| JP | 2002-279943 | 9/2002 |
| JP | 2005-302719 | 10/2005 |

(Continued)

OTHER PUBLICATIONS

Office Action dated Aug. 6, 2012 for corresponding KR Application No. 10-2011-0023349.

(Continued)

*Primary Examiner* — Gregg Cantelmo
(74) *Attorney, Agent, or Firm* — Knobbe, Martens, Olson & Bear, LLP

(57) ABSTRACT

There are provided an electrode assembly and a secondary battery using the same. An electrode assembly includes a first electrode plate having a first non-coating portion formed along one end portion in a length direction thereof; a second electrode plate having a second non-coating portion formed along the other end portion opposite to the first non-coating portion; and a separator interposed between the first and second electrode plates. In the electrode assembly, the first electrode plate, the second electrode plate and the separator are wound in a jelly-roll shape, and the electrode assembly further includes a clamping member that fixes at least one of the first and second non-coating portions. Accordingly, although the thickness of an electrode tab is increased, it is possible to simply manufacture high-power, high-capacity medium- and large sized batteries.

16 Claims, 5 Drawing Sheets

(56) References Cited

FOREIGN PATENT DOCUMENTS

| | | |
|---|---|---|
| JP | 2009-087612 | 4/2009 |
| KR | 2006-0010482 | 2/2006 |
| KR | 0637443 | 10/2006 |
| KR | 2010-0102542 | 9/2010 |

OTHER PUBLICATIONS

Office Action dated Jan. 30, 2013 for corresponding KR Application No. 10-2011-0023349.

* cited by examiner

ELECTRODE ASSEMBLY AND SECONDARY BATTERY USING THE SAME

RELATED APPLICATIONS

This application claims priority to and the benefit of Korean Patent Application No. 10-2011-0023349, filed on Mar. 16, 2011, in the Korean Intellectual Property Office, the entire content of which is incorporated herein by reference.

BACKGROUND

1. Field

An aspect of the present invention relates to an electrode assembly and a secondary battery using the same, and more particularly, to a high-power and high-capacity electrode assembly and a secondary battery using the same.

2. Description of the Related Art

An electrode assembly of a secondary battery may be formed into various types. Among various types of electrode assemblies, a jelly-roll type electrode assembly is formed by winding a positive electrode plate, a negative electrode plate and a separator interposed therebetween. In this instance, a positive electrode tab and a negative electrode tab are fused and bonded to non-coating portions of the positive and negative electrode plates, respectively.

In a case where a high-power and high-capacity battery is implemented using the jelly-roll type electrode assembly, the thickness of the electrode tab is increased. However, if the electrode tab meets or exceeds a certain thickness, it is difficult to fuse and bond the electrode tab to the non-coating portion of the electrode plate. Further, since dust and the like are produced in the fusing and bonding process, a thicker electrode tab may make it harder to implement a high-power and high-capacity battery.

SUMMARY

Embodiments provide an electrode assembly and a secondary battery using the same in which an electrode tab is formed to clamp to a non-coating portion of an electrode plate in an implementation of a medium- or large-sized battery, so that it is possible to omit a process of bonding the electrode tab to the electrode plate.

According to an aspect of the present invention, there is provided an electrode assembly including: a first electrode plate having a first non-coating portion formed along one end portion in a length direction thereof; a second electrode plate having a second non-coating portion formed along the other end portion opposite to the first non-coating portion; and a separator interposed between the first and second electrode plates, wherein the first electrode plate, the second electrode plate and the separator are wound in a jelly-roll shape, and the electrode assembly further includes a clamping member that fixes to at least one of the first and second non-coating portions.

The clamping member may be provided with a first clamping member that fixes to the first non-coating portion and a second clamping member that fixes to the second non-coating portion.

Adjacent first or second non-coating portions may come in contact with each other in a region corresponding to the first or second clamping member.

The clamping member may be further provided with protruding portions formed in a region that comes in contact with the at least one of the first and second non-coating portions.

The vertical section of the clamping member in the length direction may be formed in a 'C' or '⊏' shape.

The clamping member may be formed of any one selected from the group consisting of Al, Cu and Ni.

First and second active material layers may be respectively formed on the first electrode plate except the region in which the first non-coating portion is formed and on the second electrode plate except the region in which the second non-coating portion is formed.

The first active material layer, the separator and the second active material layer may be wound so that they are overlapped with one another.

According to an aspect of the present invention, there is provided a secondary battery including the electrode assembly and a housing that accommodates the electrode assembly.

The secondary battery may further include an electrode lead having one side exposed to an outside of the housing and the other side electrically connected to the clamping member.

The clamping member may be electrically connected to the electrode lead through welding or screw bonding.

When the clamping member is screw-bonded to the electrode lead, a groove having screw threads and valleys formed therein may be formed in the clamping member, and an end portion of the electrode lead may be formed in the shape of a screw.

A hole through which the electrode lead passes may be formed in the housing.

The housing may be formed in the shape of a prismatic can, and an insulating gasket may be further formed in the hole.

The housing may be formed in a pouch shape, and an insulation tape may be further formed in a region of the electrode lead that comes in contact with the housing.

The secondary battery may be applied to a medium- or large-sized battery of 5 Ah or more.

As described above, according to embodiments of the present invention, as an electrode tab clamps to an electrode plate without a process of bonding the electrode tab to the electrode plate, it is possible to easily manufacture a high-power, high capacity medium- or large-sized battery even though the thickness of the electrode tab is increased.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
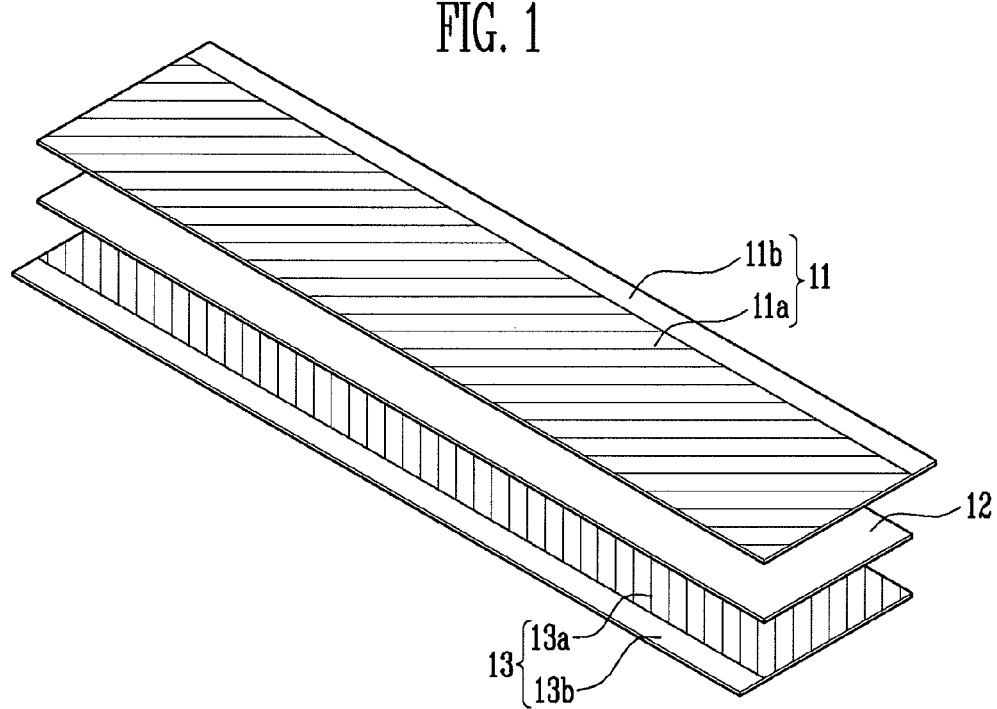
FIG. 1 is a perspective view showing a state wherein a first electrode plate, a separator and a second electrode plate are separated from one another according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

FIG. 1 is a perspective view showing a state wherein a first electrode plate, a separator and a second electrode plate are separated from one another according to an embodiment of the present invention.

Referring to FIG. 1, the first electrode plate 11 includes a first non-coating portion 11$b$ formed along one end portion in the length direction thereof and a first active material layer 11$a$ formed in a region except the region in which the first non-coating portion 11$b$ is formed. The second electrode plate 13 includes a second non-coating portion 13$b$ formed along the other end portion opposite to the first non-coating portion 11$b$ in the length direction thereof and a second active material layer 13$a$ formed in a region except the region in which the second non-coating portion 13$b$ is formed. The separator 12 is interposed between the first and second electrode plates 11 and 13.

Hereinafter, for convenience for illustration, the first and second electrode plates 11 and 13 will be described as positive and negative plates, respectively. In addition, the first active material layer 11$a$ and the first non-coating portion 11$b$ will be described as a positive electrode active material layer and a positive electrode non-coating portion, respectively. The second active material layer 13$a$ and the second non-coating portion 13$b$ will be described as a negative electrode active material layer and a negative electrode non-coating portion.

The positive electrode plate 11, the negative electrode plate 13 and the separator 12 will be briefly described. The positive electrode plate 11 includes a positive electrode collector having excellent conductivity, the positive electrode active material layer 11$a$ formed by coating a positive electrode active material on at least one surface of the positive electrode collector and the positive electrode non-coating portion 11$b$ on which the positive electrode active material is not coated. Aluminum (Al) having excellent conductivity is generally used as the positive electrode collector. The positive electrode active material layer 11$a$ is formed by coating a positive electrode slurry on the at least one surface of the positive electrode collector. In this instance, the positive electrode slurry is prepared by mixing the positive electrode active material, a conducting agent and a positive electrode binder in a solvent.

Here, the positive electrode active material generates electrons by participating in a positive electrode chemical reaction of a lithium secondary battery, and the conducting agent transfers the electrons generated in the positive electrode material to the positive electrode collector. The positive electrode binder binds the positive electrode active material and the conducting agent, and maintains the mechanical strength of the positive electrode plate 11.

Lithium complex metal oxides such as $LiCoO_2$, $LiMn_2O_4$, $LiNiO_2$, $LiNi-xCoxO_2(0<x>1)$ and $LiMnO_2$ may be used as the positive electrode active material. However, the present invention is not limited thereto.

The negative electrode plate 13 includes a negative electrode collector made of a conductive metal thin film, the negative electrode active material layer 13$a$ formed by coating a negative electrode active material on at least one surface of the negative electrode collector, and the negative electrode non-coating portion 13$b$ is the portion on which the negative electrode active material is not coated.

Here, the negative electrode collector may be formed of copper (Cu) or nickel (Ni). Any one of hard carbon, soft carbon and graphite may be mainly used as the negative electrode active material. However, the present invention is not limited thereto.

The separator 12 is interposed between the positive and negative electrode plates 11 and 13, and an insulative thin film having high ion transmittance and mechanical strength is used as the separator 12. The separator 12 prevents an electrical short circuit between positive and negative electrodes in charge/discharge, and enables only lithium ions to move between the positive and negative electrode plates.

The separator 12 may be formed of a fine porous material so that the lithium ions can move between the positive and negative electrode plates. For example, the separator 12 may be formed of polyethylene (PE), polypropylene (PP), polyolefin resin or equivalent thereof, which has a plurality of fine through-holes. However, the present invention is not limited thereto.

Figure 2:
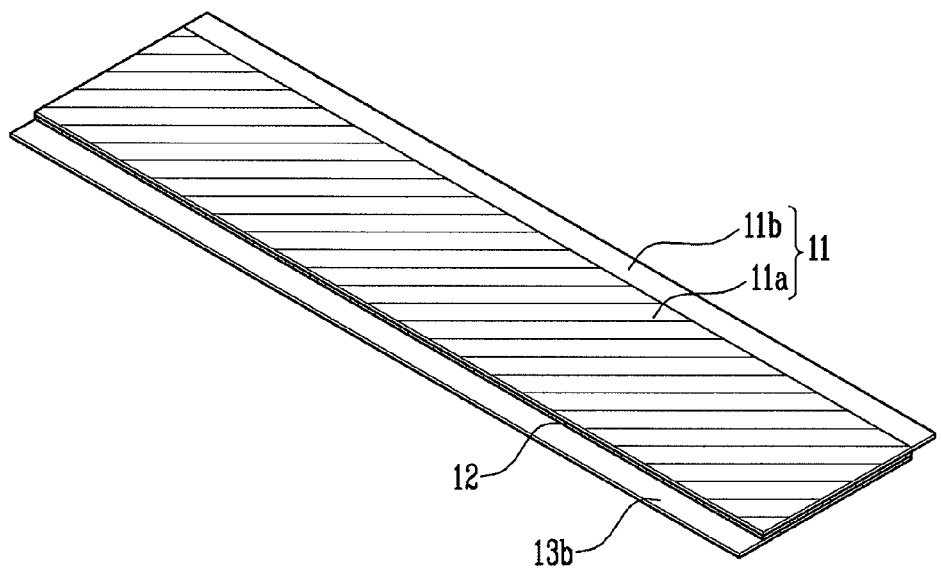
FIG. 2 is a perspective view showing a state wherein the first electrode plate, the separator and the second electrode plate are overlapped with one another according to the embodiment of the present invention.

FIG. 2 is a perspective view showing a state wherein the first electrode plate, the separator and the second electrode plate are overlapped with one another according to the embodiment of the present invention.

Referring to FIG. 2, the separator 12 interposed between the positive and negative electrode plates 11 and 13 is positioned in the state wherein they are overlapped with one another before they are wound. In this instance, the positive electrode non-coating portion 11$b$ formed at one end portion of the positive electrode 11 and the negative electrode non-coating portion 13$b$ formed at the other end portion of the negative electrode plate 13 are not overlapped with the separator 12. That is, only the positive electrode active material layer 11$a$, the separator 12 and the negative electrode active material layer 13$a$ (see FIG. 1) are overlapped with one another.

Figure 3:
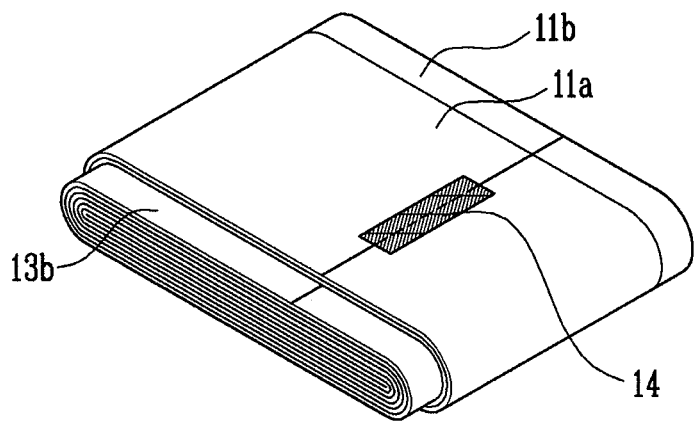
FIG. 3 is a perspective view of an electrode assembly according to the embodiment of the present invention.

FIG. 3 is a perspective view of an electrode assembly according to the embodiment of the present invention.

Referring to FIG. 3, the electrode assembly according to this embodiment, is wound so that the positive and negative electrode non-coating portions 11$b$ and 13$b$ are positioned opposite to each other. In the jelly-roll type electrode assembly, a finishing tape 14 is attached to an outer surface of the electrode assembly so that a finished portion of the electrode assembly is not undone.

Figure 4:
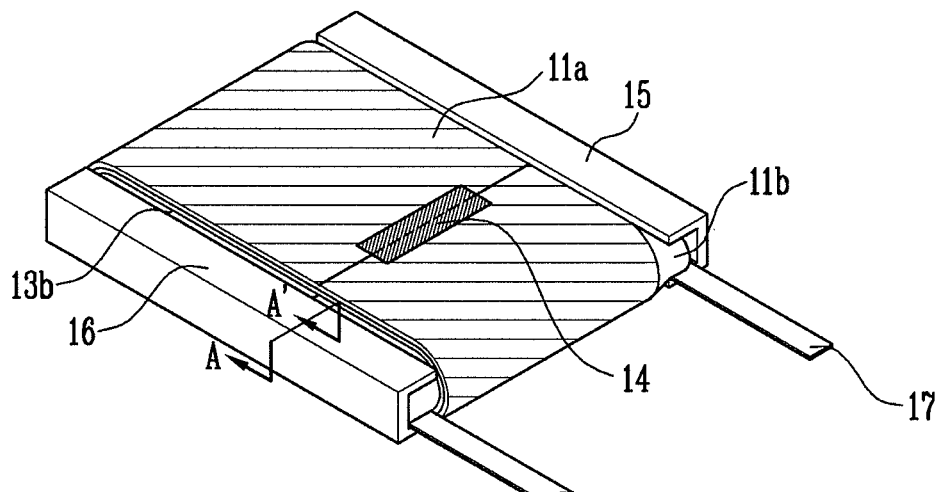
FIG. 4 is a perspective view showing a state wherein electrode leads are connected to the electrode assembly according to the embodiment of the present invention.

FIG. 4 is a perspective view showing a state wherein electrode leads are connected to the electrode assembly according to the embodiment of the present invention.

Referring to FIG. 4, first and second clamping members 15 and 16 are positioned at the positive and negative electrode non-coating portions 11b and 13b so as to fix the positive and negative electrode non-coating portions 11b and 13b, respectively.

Each of the first and second clamping members 15 and 16 is formed so that its vertical section in its length direction has a 'C' or '⊏' shape. Accordingly, the positive and negative electrode non-coating portions 11b and 13b have a shape in which they are clamped by the first and second clamping members 15 and 16, respectively.

Here, adjacent positive or negative electrode non-coating portions 11b or 13b come in contact with each other in a region corresponding to the first or second clamping member 15 or 16. That is, the positive or negative electrode non-coating portions 11b or 13b are fastened by the first or second clamping member 15 or 16, respectively. This results in the positive non-coating portions 11b being confined in a space defined by the first clamping member and the negative non-coating portions being confined in a space defined by clamp member 16.

The first and second clamping members 15 and 16 may be formed of a material selected from the group consisting of Al, Cu and Ni. Accordingly, the first and second clamping members 15 and 16 can serve as positive and negative electrode tabs, respectively.

The first and second clamping members 15 and 16 that serve as the positive and negative electrode tabs clamp substantially all of or the whole of the positive electrode non-coating portions 11b and substantially all of or the whole of the negative electrode non-coating portions 13b, respectively, so that it is possible to facilitate their connection. Although the thicknesses of the positive and negative electrode non-coating portions 11b and 13b are increased, the sizes of the first and second clamping members 15 and 16 are adjusted, so that it is possible to easily implement a high-power, high capacity medium- or large-sized battery.

Protruding portions may be further formed at each of the first and second clamping members 15 and 16. The protruding portions will be described later in FIG. 5.

The first and second clamping members 15 and 16 may be electrically connected to first and second electrode leads 17 and 18, respectively. One side of the first and second electrode leads 17 and 18 is exposed to the exterior of a housing, and the other side of the first and second electrode leads 17 and 18 may be connected to the first and second clamping members 15 and 16 through welding, respectively. The welding of the other sides of the first and second electrode leads 17 and 18 to the first and second clamping members 15 and 16 may be performed before or after the positive and negative electrode non-coating portions 11b and 13b are clamped by the first and second clamping members 15 and 16, respectively.

Figure 5:
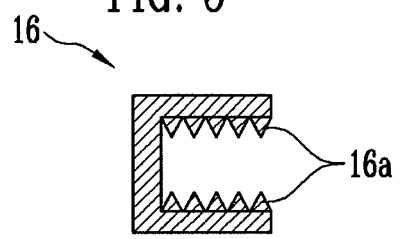
FIG. 5 is a sectional view taken along line A-A' of FIG. 4.

FIG. 5 is a sectional view taken along line A-A' of FIG. 4.

Referring to FIG. 5, protruding portions 16a may be further formed on the inner surface of the second clamping member 16 that comes in contact with the negative electrode non-coating portion 13b (see FIG. 4). Here, a surface of the protruding portion 16a that comes in contact with the negative electrode non-coating portion 13b is formed in the shape of a sharp triangle. However, the present invention is not limited thereto. The negative electrode non-coating portion 13b may be more firmly clamped by the protruding portions 16a.

Although not shown in this figure, like the second clamping member 16, protruding portions may be formed on the inner surface of the first clamping member 15 (see FIG. 4) that comes in contact with the positive electrode non-coating portion 11b (see FIG. 4).

Figure 6:
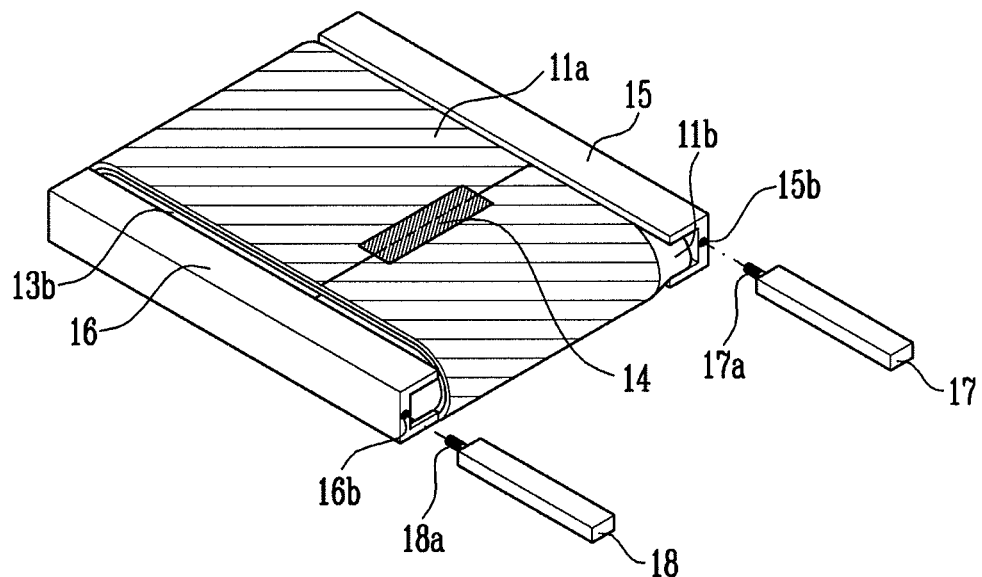
FIG. 6 is a perspective view showing a state wherein the electrode leads are connected to the electrode assembly in a different form from that of FIG. 4.

FIG. 6 is a perspective view showing a state wherein the electrode leads are connected to the electrode assembly in a different form from that of FIG. 4.

Referring to FIG. 6, the first and second clamping members 15 and 16 may be electrically connected to the first and second electrode leads 17 and 18 by screw bonding, respectively. In a case where the first and second clamping members 15 and 16 are screw-bonded to the first and second electrode leads 17 and 18, respectively, grooves 15b and 16b each having screw threads and valleys formed therein may be formed in the first and second clamping members 15 and 16, respectively. Ends of the first and second electrode leads 17 and 18 may be formed in the shape of screws 17a and 18a, respectively.

Accordingly, the screws 17a and 18a at the ends of the first and second electrode leads 17 and 18 are engaged with the grooves 15b and 16b of the first and second clamping members 15 and 16, respectively. Thus, the first and second clamping members 15 and 16 can be electrically connected to the first and second electrode leads 17 and 18, respectively.

Figure 7:
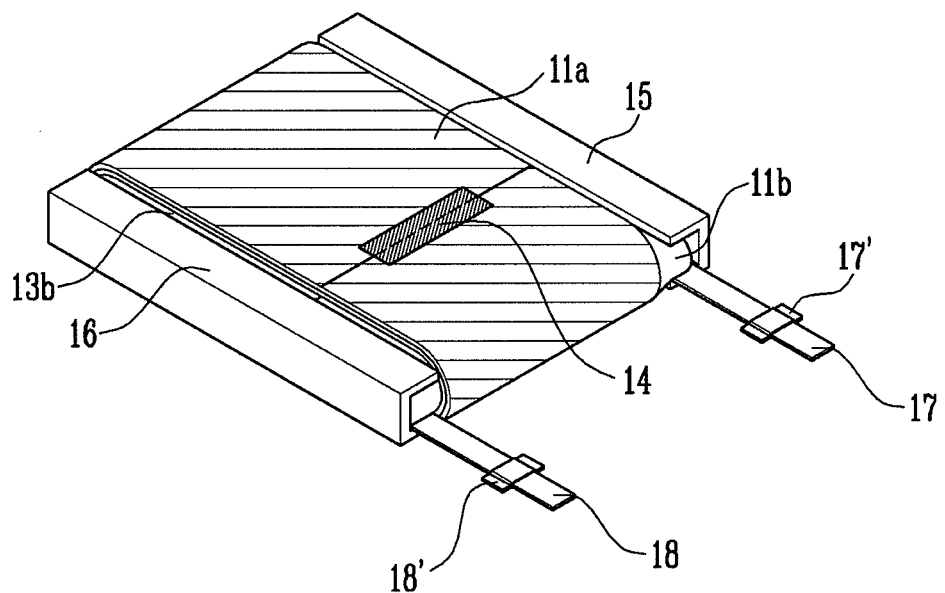
FIG. 7 is a perspective view showing a state wherein an insulation tape is adhered to the electrode leads according to an embodiment of the present invention.

FIG. 7 is a perspective view showing a state wherein an insulation tape is adhered to the electrode leads according to an embodiment of the present invention.

Figure 9:
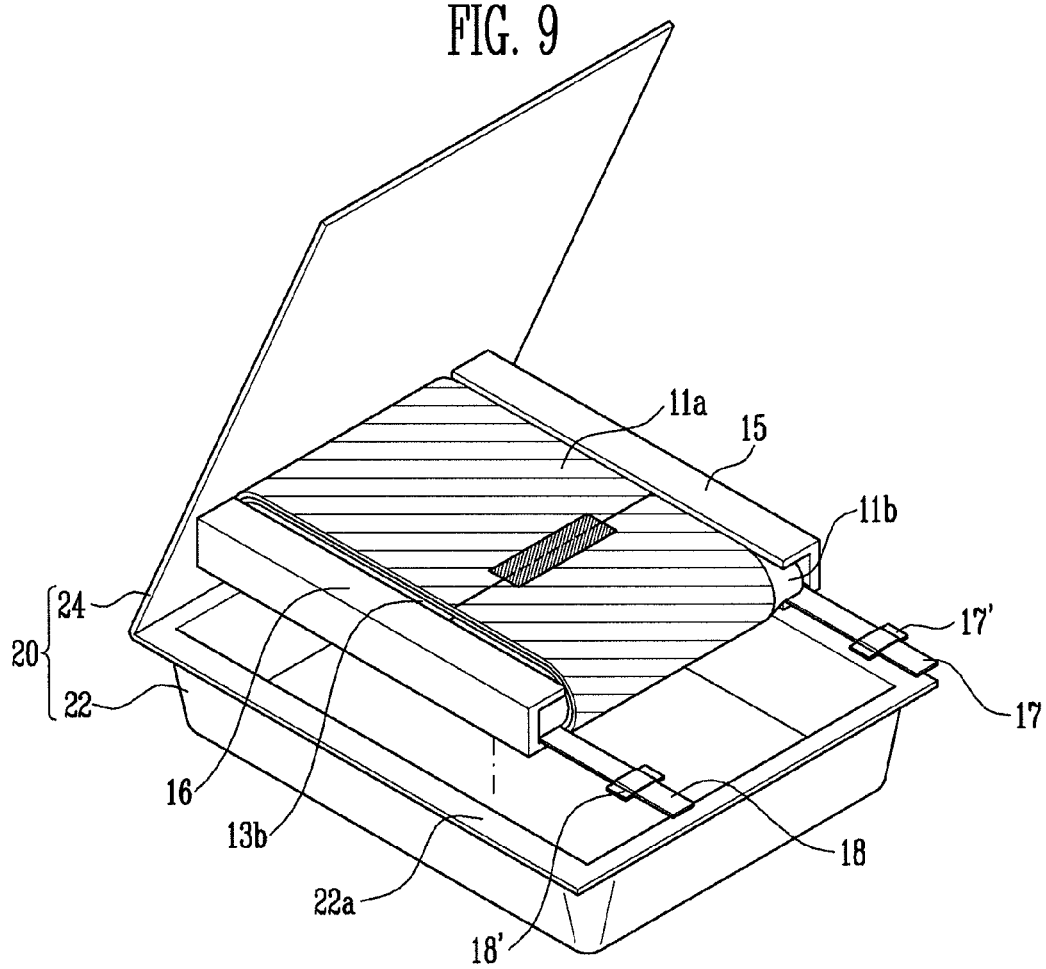
FIG. 9 is a perspective view of a pouch-type secondary battery according to an embodiment of the present invention.

Referring to FIG. 7, insulation tapes 17' and 18' are attached to the first and second electrode leads 17 and 18. In a case where the electrode assembly is inserted into the interior of a pouch-type outer case as shown in FIG. 9, the insulation tapes 17' and 18' are attached to the respective first and second electrode leads 17 and 18 so as to insulate the outer case from the first and second electrode leads 17 and 18.

That is, the insulation tapes 17' and 18' are attached to the respective first and second electrode leads 17 and 18 so as to increase the sealing between the outer case and the first and second electrode leads 17 and 18 and to ensure electrical insulation of the outer case from the first and second electrode leads 17 and 18.

Figure 8:
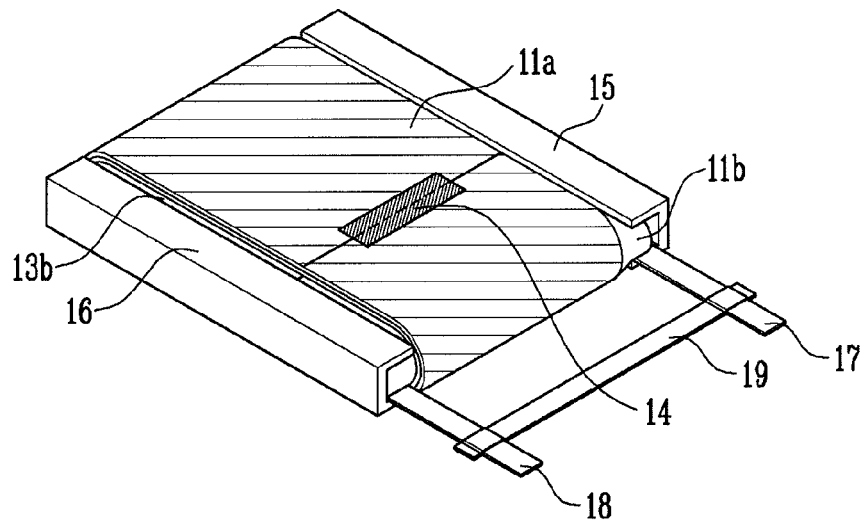
FIG. 8 is a perspective view showing a state that the insulation tape is adhered to the electrode leads in a different form from that of FIG. 7.

FIG. 8 is a perspective view showing a state wherein the insulation tape is adhered to the electrode leads in a different form from that of FIG. 7. In FIG. 8, descriptions of components identical to those of FIG. 7 will be omitted.

In FIG. 7, the insulation tapes 17' and 18' are attached to the first and second electrode leads 17 and 18. However, in FIG. 8, an insulation tape 19 may be formed to be extended to the first and second electrode leads 17 and 18. That is, the insulation tape 19 is formed in a single body, thereby simplifying processes.

FIG. 9 is a perspective view of a pouch-type secondary battery according to an embodiment of the present invention.

Referring to FIG. 9, an electrode assembly according to the present invention is accommodated in the interior of a pouch case 20. The pouch case 20 includes an accommodating portion 22 and a cover portion 24 that seals the accommodating portion 22.

The pouch case 20 is generally formed to have a stacking structure in which a synthetic resin such as nylon, polypropylene or polyethylene is coated on top and bottom surfaces of an aluminum thin film. Inner surfaces of the pouch case 20 are made of a heat adhesive resin for the purpose of sealing the pouch case 20. Thus, the heat adhesive resins respectively coated on the inner surfaces of the pouch case 20 are mutually bonded along its circumference through heating and pressing, thereby forming a sealing portion 22a.

When the electrode assembly is accommodated in the accommodating portion 22 of the pouch case 20, the first and second electrode leads 17 and 18 respectively bonded to the first and second clamping members 15 and 16 are partially exposed to the exterior of the pouch case 20. In this instance, the insulation tapes 17' and 18' for increasing the sealing between the pouch case 20 and the first and second electrode leads 17 and 18 are attached to the respective first and second electrode leads 17 and 18 that come in contact with the pouch case. Preferably, the insulation tapes 17' and 18' come in contact with the pouch case at the sealing portion 22a.

Figure 10:
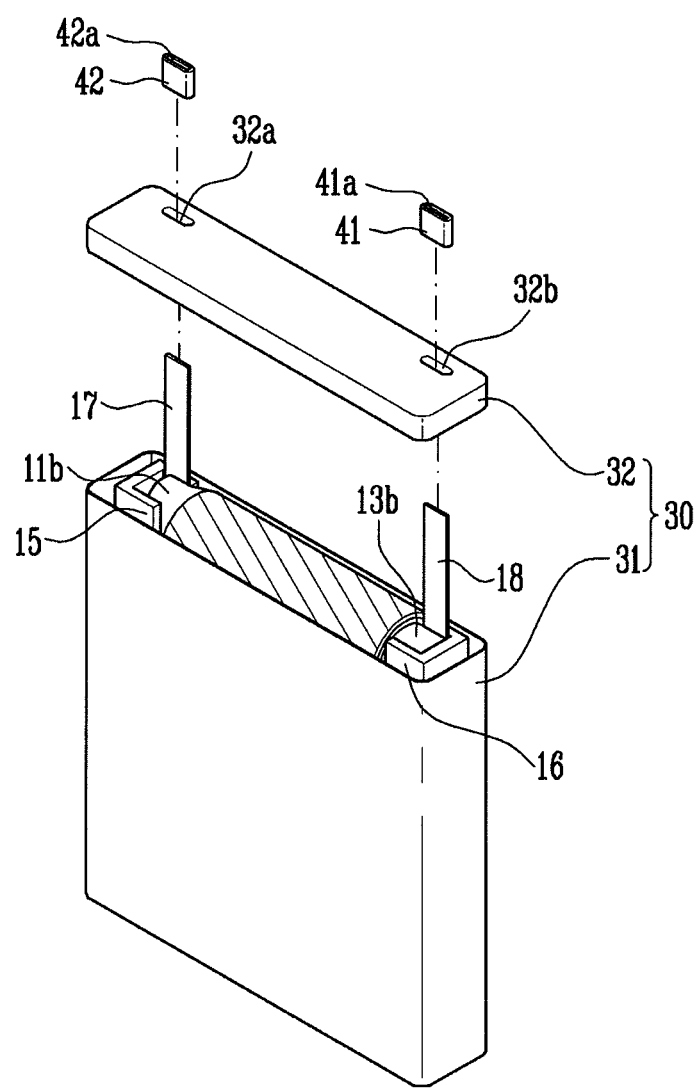
FIG. 10 is a perspective view of a prismatic secondary battery according to an embodiment of the present invention.

FIG. 10 is a perspective view of a prismatic secondary battery according to an embodiment of the present invention.

Referring to FIG. 10, the secondary battery according to this embodiment includes an electrode assembly and a prismatic housing 30 that accommodates the electrode assembly. The housing 30 is provided with a case 31 having an opened portion and a cover 32 that seals the opened portion of the case 31.

First and second holes 32a and 32b through which the first and second electrode leads 17 and 18 pass, respectively, may be formed in the cover 32. In a case where the case 31 and the cover 32 are formed of a conductive material like the can, insulating gaskets 41 and 42 may be further formed in the respective first and second holes 32a and 32b so as to insulate the cover 32 from the first and second electrode leads 17 and 18. Through-holes 41a and 42a are formed at the centers of the insulating gaskets 41 and 42 so that the first and second electrode leads 17 and 18 can pass through the insulating gaskets 41 and 42, respectively.

As described above, in the secondary battery according to this embodiment, it is possible to facilitate the fixation of the first and second clamping members 15 and 16 that serve as the positive and negative electrode plates 11 and 12, respectively. Thus, the secondary battery can be applied to medium- and large-sized batteries with a high power and capacity of 5 Ah or more.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly comprising:
   a first electrode plate having a first non-coating portion formed along one end portion in a length direction thereof;
   a second electrode plate having a second non-coating portion formed along the other end portion opposite to the first non-coating portion; and
   a separator interposed between the first and second electrode plates,
   wherein the first electrode plate, the second electrode plate and the separator are wound in a jelly-roll shape, and the electrode assembly further comprises at least one clamping member that fixes at least one of either the first or second non-coating portions wherein the at least one clamping member includes a plurality of triangular protruding portions that engage with the non-coating portions positioned within the at least one clamping member.

2. The electrode assembly according to claim 1, wherein the at least one clamping member comprises a first clamping member that fixes the first non-coating portion and a second clamping member that fixes the second non-coating portion.

3. The electrode assembly according to claim 2, wherein adjacent first or second non-coating portions come in contact with each other in a region corresponding to the first or second clamping member.

4. The electrode assembly according to claim 1, wherein the vertical section of the at least one clamping member in the length direction is formed in a 'C' or '⊏' shape.

5. The electrode assembly according to claim 1, wherein the at least one clamping member is formed of any one selected from the group consisting of Al, Cu and Ni.

6. The electrode assembly according to claim 1, wherein first and second active material layers are respectively formed on the first electrode plate except the region in which the first non-coating portion is formed and the second electrode plate except the region in which the second non-coating portion is formed.

7. The electrode assembly according to claim 6, wherein the first active material layer, the separator and the second active material layer are wound so that they are overlapped with one another.

8. A secondary battery comprising:
   an electrode assembly having a first electrode plate and a second electrode plate with a separator interposed therebetween wherein the first electrode plate having coated and uncoated portions, the second electrode plate having coated and uncoated portions and the separator are rolled so that a plurality of uncoated portions of at least the first and second electrode plates are respectively positioned proximate to each other adjacent a first and second lateral side of the electrode assembly;
   at least one clamping member that defines a recess that receives at least one of the plurality of uncoated portions of either of the first and second electrode plates that are respectively positioned proximate to each other adjacent the first and second lateral side of the electrode assembly wherein the at least one clamping member includes a plurality of triangular protruding portions that engage with the non-coating portions positioned within the at least one clamping member; and
   a housing that receives the electrode assembly.

9. The secondary battery according to claim 8, further comprising an electrode lead having one side exposed to an outside of the housing and the other side electrically connected to the at least one clamping member.

10. The secondary battery according to claim 8, wherein the at least one clamping member is electrically connected to the electrode lead through welding or screw bonding.

11. The secondary battery according to claim 9, wherein, when the at least one clamping member is screw-bonded to the electrode lead, a groove having screw threads and valleys formed therein is formed in the at least one clamping member, and an end portion of the electrode lead is formed in the shape of a screw.

12. The secondary battery according to claim 9, wherein a hole through which the electrode lead passes is formed in the housing.

13. The secondary battery according to claim 12, wherein the housing is formed in the shape of a prismatic can, and an insulating gasket is further formed in the hole.

14. The secondary battery according to claim 13, wherein the secondary battery is applied to a medium- or large-sized battery of 5 Ah or more.

15. The secondary battery according to claim 9, wherein the housing is formed in a pouch shape, and an insulation tape is further formed in a region of the electrode lead that comes in contact with the housing.

16. The secondary battery according to claim 15, wherein the secondary battery is applied to a medium- or large-sized battery of 5 Ah or more.

* * * * *